US005684372A

United States Patent [19]
Fitzgibbon et al.

[11] Patent Number: 5,684,372
[45] Date of Patent: Nov. 4, 1997

[54] GARAGE DOOR OPERATOR SAFETY APPARATUS

[75] Inventors: James J. Fitzgibbon, Streamwood; Colin B. Willmott, Buffalo Grove, both of Ill.

[73] Assignee: The Chamberlain Group, Inc., Elmhurst, Ill.

[21] Appl. No.: 588,227

[22] Filed: Jan. 18, 1996

Related U.S. Application Data

[63] Continuation of Ser. No. 465,606, Jun. 5, 1995, abandoned, which is a continuation of Ser. No. 367,920, Jan. 3, 1995, abandoned, which is a continuation of Ser. No. 200,292, Feb. 22, 1994, abandoned, which is a continuation of Ser. No. 964,566, Oct. 21, 1992, abandoned, which is a continuation of Ser. No. 682,671, Apr. 9, 1991, abandoned.

[51] Int. Cl.[6] ............................................. H02P 3/00
[52] U.S. Cl. ............................................. 318/280; 318/466
[58] Field of Search ............................ 318/280–286, 318/466–470, 256, 265, 461, 463; 49/26, 28, 118, 141; 160/292, 293.1; 361/23, 25, 31

[56] References Cited

U.S. PATENT DOCUMENTS

| | | | |
|---|---|---|---|
| 4,234,833 | 11/1980 | Barrett | 318/282 |
| 4,338,553 | 7/1982 | Scott, Jr. | 318/466 X |
| 4,364,003 | 12/1982 | Phipps | 318/466 |
| 4,383,206 | 5/1983 | Matsuoka et al. | 318/445 |
| 4,386,398 | 5/1983 | Matsuoka et al. | 318/266 X |
| 4,455,517 | 6/1984 | Mitchell | 318/283 |
| 4,498,033 | 2/1985 | Aihara et al. | 318/466 X |
| 4,563,625 | 1/1986 | Kornbrekke et al. | 318/283 X |
| 4,638,433 | 1/1987 | Schindler | 364/400 |
| 4,750,118 | 6/1988 | Heitschel et al. | 364/400 |
| 4,831,509 | 5/1989 | Jones et al. | 318/466 X |
| 4,922,168 | 5/1990 | Waggamon et al. | 318/286 |
| 4,929,877 | 5/1990 | Clark et al. | 318/468 X |
| 4,980,618 | 12/1990 | Milnes et al. | 318/286 X |
| 4,986,646 | 1/1991 | Hamamoto et al. | 318/466 X |
| 5,039,925 | 8/1991 | Schap | 318/282 |
| 5,081,403 | 1/1992 | Matsuura et al. | 318/280 |
| 5,218,282 | 6/1993 | Duhame | 318/434 X |

FOREIGN PATENT DOCUMENTS 2072884 10/1981 United Kingdom.

*Primary Examiner*—Jonathan Wysocki
*Attorney, Agent, or Firm*—Fitch, Even, Tabin & Flannery

[57] ABSTRACT

A garage door opening and closing apparatus having improved operational safety is disclosed. The apparatus includes a control circuit which responds to a number of input stimuli to generate commands to open and close a garage door as well as to stop garage door movement. Three relays respond to the commands via drive circuitry to actually connect door operating voltages to the windings of a door controlling motor. By redundancies in the operation of the three relays, faults in the operation of those relays result in safe door operating conditions. Additionally, the control circuitry upon issuing a door stop command, performs a test to determine whether or not the door is still moving. If the door is still moving, door up commands are generated by the control circuitry to place the door in a safe position.

13 Claims, 3 Drawing Sheets

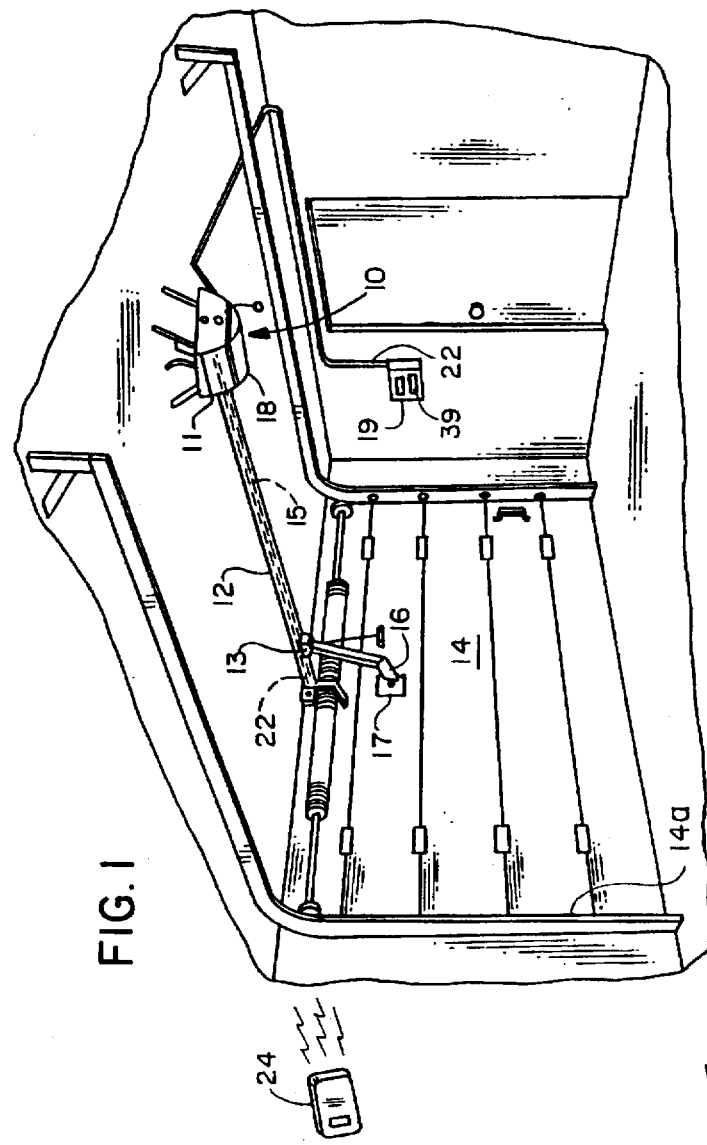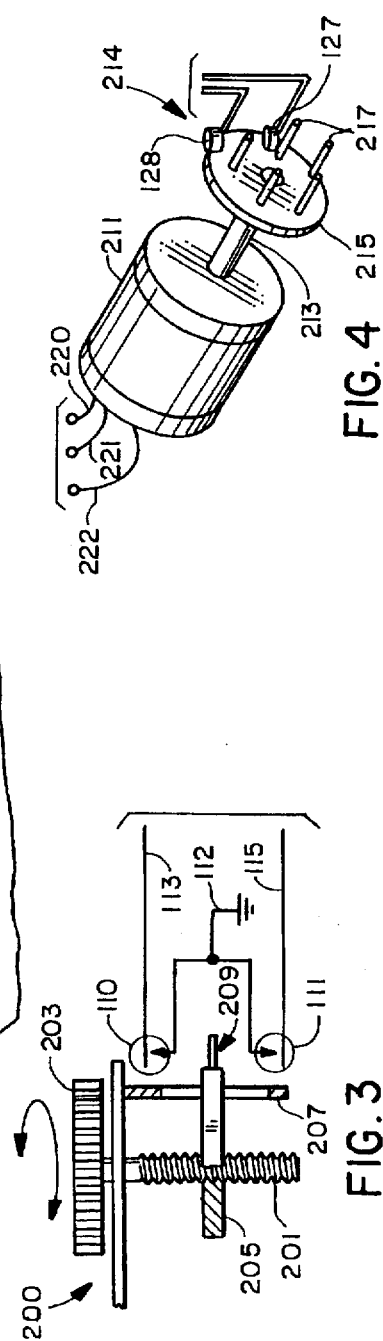

GARAGE DOOR OPERATOR SAFETY APPARATUS

This application is a continuation of application Ser. No. 08/465,606 filed Jun. 5, 1995, now abandoned, which is a continuation of application Ser. No. 08/367,920 filed Jan. 3, 1995, now abandoned, which is a continuation of application Ser. No. 08/200,292 filed Feb. 22, 1994, now abandoned, which is a continuation of application Ser. No. 07/964,566 filed Oct. 21, 1992, now abandoned which is a continuation of application Ser. No. 07/682,671 filed Apr. 9, 1991, now abandoned.

BACKGROUND OF THE INVENTION

This invention relates to door opening and closing apparatus and particularly to methods and apparatus for improving the operational safety of door opening and closing apparatus.

A garage door operator for opening and closing doors typically includes an electrical motor having an up winding and a down winding. When the up winding is energized by an operating voltage, the motor shaft rotates in one direction to raise the door and when the down winding is energized by the operating voltage, the motor shaft rotates in the opposite direction to lower the door. A control unit responds to external stimuli such as door open and close request signals by energizing the proper winding to serve the request. The actual connection of the operating voltage to the up and down windings is provided by a pair of relays, one associated with each winding, the relays respond to signals from the control unit by connecting the source of operating voltage to their associated windings. The control unit frequently comprises integrated circuit logic which individually operates the relays via relay drivers.

Integrated circuit logic is subject to faults as are relay drivers and relays themselves. Thus, improper relay control signals can be generated by the integrated circuit logic or proper control signals can be inappropriately responded to by the drivers and relays. Although such faulty operation is infrequent, the effects of such are to be avoided, since they can, in extreme situations, cause injury to people in the vicinity of the apparatus.

The problem of faulty operation has been recognized and systems devised to protect individuals from faulty operation. U.S. Pat. No. 4,338,553 to Scott, Jr. discloses an apparatus which, when a door limit controlling oscillator fails, generates relay control signals to move a door to the up position. The Scott, Jr. arrangement checks only the proper oscillator operation, and does not determine proper door operation in response to generated control signals. U. K. Patent Application No. 2 072 884 to Matsuoka, et al., discloses an apparatus which uses timers to check for proper door operation. When a door operation such as opening the door, is not completed within a period of time, e.g., 23 seconds, representing the maximum time for the completion of the operation, the timer signals a fault and remedial action is taken. The remedial action is to remove the driving voltage from both up and down motor windings by means of a first relay and to energize the up winding by means of a second relay. Importantly, no fault will be sensed by the disclosed arrangement until a door movement should be completed, e.g., 23 seconds, by which time injury may have occurred. Also importantly, the additional relays and circuitry required for the response to faulty door operation are not normally exercised so that faults within them will remain untested and the additional relays and circuitry add to the expense and complexity of the apparatus.

Known fault protection systems for garage door operators do not detect inappropriate door movement rapidly enough, are not tested by normal operation, and add unnecessarily to the expense and complexity of the overall apparatus.

SUMMARY OF THE INVENTION

The present invention solves the problems of prior systems by rapidly sensing inappropriate door movement and terminating such inappropriate movement using a minimum amount of additional circuitry, which is routinely exercised to protect against latent faults. The apparatus of the present invention includes circuitry for sensing the rotation of the door driving motor shaft and checking such rotation after issuing door operating commands. When the measured rotation is not appropriate for the last door operating command, fault control signals are generated. The door controlling circuitry of the apparatus includes three (3) door controlling switch arrangements for selectively energizing the up and down motor windings of the door driving motor. A control unit operates in cooperation with the motor shaft rotation sensor to detect improper door movement and to control the switching circuits to stop and move the door up. Upward movement of the door is assured when faced with any single fault in the door control circuitry.

An apparatus for opening and closing a garage door in accordance with the present invention comprises a motor with a rotatable member for rotating in a first direction to open the garage door and in a second direction to close the garage door, and motor control circuitry responsive to control commands for selectively connecting electrical power to the motor to cause rotation of the rotatable member. A control arrangement, shown in the embodiment as a logic unit, responds to external stimuli by selectively sending control commands specifying rotation of the rotatable member in the first direction, rotation of the rotatable member in the second direction or no rotation by the rotatable member. After predetermined control commands, the actual rotation of the rotatable member is sensed and when actual sensed rotation is not in accordance with the last control command, fault control signals are sent to the motor control circuitry. The fault control signals can be used to cause the motor to raise the door to its safe upper limit.

Advantageously, the motor control circuitry comprises a plurality of relays which cooperate to provide safe operation of the door when faults occur within the motor control circuitry. In the preferred embodiment, the motor includes up and down windings for controlling the two directions of rotatable member rotation. The motor control circuitry includes a first relay which responds to control commands by connecting electrical power to either the up motor winding or to an intermediate conductor. A second relay responds to control commands by selectively connecting the intermediate conductor from the first relay to the down winding, and a third relay responds to control commands by connecting electrical power to the up winding. By this interconnection of relays, door movement can always be stopped and in most situations, it will be stopped in the upmost door position.

The logic unit of the embodiment responds to the external stimuli by generating upward movement control commands, downward movement control commands and door stop commands. When the door movement after a command is not in accordance with the command, the logic unit generates fault control signals which cause upward movement of the door.

BRIEF DESCRIPTION OF THE DRAWINGS

FIG. 1 illustrates the garage door operator of the invention installed to operate a garage door;

FIG. 3 illustrates the control of limit switches by a rotatable member of a garage door operator;

FIG. 4 illustrates a garage door operator motor and rotation determining apparatus.

DETAILED DESCRIPTION OF THE PREFERRED EMBODIMENT

Figure 2:
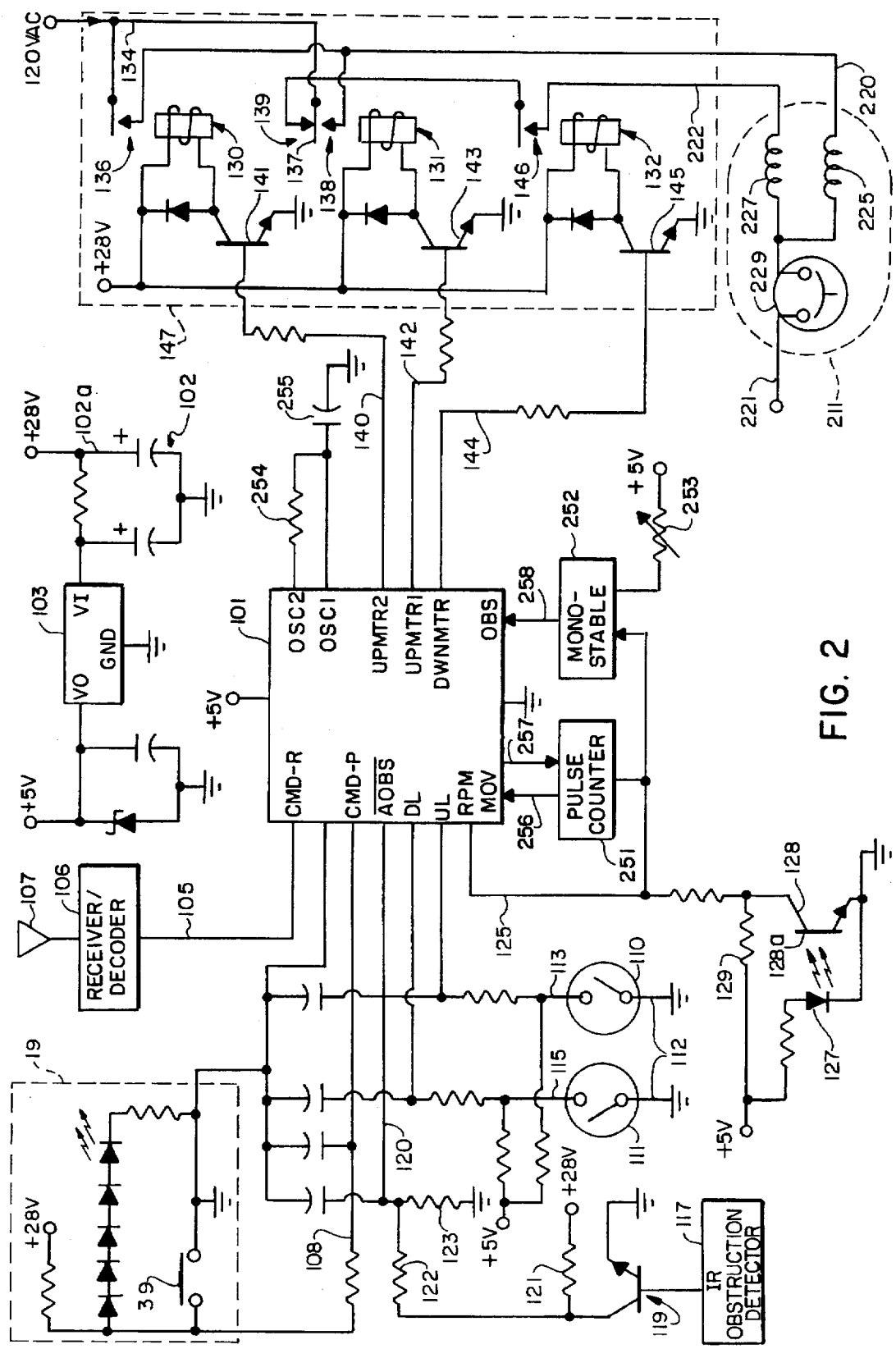
FIG. 2 is a block diagram of a control circuit of the garage door operator.

FIG. 1 illustrates the garage door operator 10 of the invention installed to move a garage door 14 positioned proximate with a door opening 14a, which is mounted on tracks in a conventional manner. A head unit 11 of the garage door operator 10 includes a motor (211 FIG. 4), which is mounted in the head unit and has an output which drives an endless chain 15. A trolley 13 is engageable with the chain 15 and moves on a rail 12. Trolley 13 includes an arm 16 which is connected by a bracket 17 to the door 14 to move the door up and down. A control unit 19 is connected by an electrical cable 22 to control circuitry mounted in head unit 11. Control unit 19 has a plurality of buttons which can be actuated for the control of the garage door operator 10. A transmitter 24 can be used to actuate the garage door operator 10 remotely by transmitting a radio signal which is received by a receiver mounted in the head unit 11.

FIG. 2 is a block diagram of the control circuit contained in head unit 11. The control circuit includes a multi-function integrated circuit logic unit 101, which responds to a plurality of inputs in the manner discussed below, by selectively sending one of a plurality of motor control commands to motor control circuitry 147 to control the opening and closing of the garage door. Power is supplied to the circuitry of FIG. 2 from a transformer and diode combination (not shown) which supply approximately 28 volts DC to a positive terminal 102a of a capacitor 102. The 28 volt DC is also coupled to a 5 volt regulator 103 which produces approximately 5 volts for use by the integrated circuit logic 101 and certain of the circuits connected thereto.

One input to logic 101 is a command signal CMD-R on a conductor 105 from a receiver/decoder 106. The receiver/decoder 106 receives an encoded electromagnetic radiation signal from the remote transmitter 24 at an antenna 107, detects the received encoded signal and verifies accuracy of the detected signal by comparing it to one or more stored permitted code words. When signal detected by receiver/detector 106 matches a permitted code word stored within the receiver/detector, a transitory logic 1 signal is sent to logic unit 101 via conductor 105, as the signal CMD-R. The details of code reception from remote transmitters and the verification of received codes are described in detail in U.S. Pat. No. No. 4,750,118 to Heitschel, et al., and application Ser. No. 626,909 to Heitschel, et al.

Another command signal, CMD-P, is a transitory logic 0 which is applied to logic unit 101 via a conductor 108, when a push-button 39 is pressed at control unit 19. The signals CMD-R and CMD-P are the primary operator controlled input signals to logic unit 101. The signal CMD-R indicates that a verified code was detected by receiver/detector 106 and the signal CMD-P indicates that push button 39 was pressed. As discussed in greater detail later herein, logic unit 101 interprets the receipt of these signals based on the state of the logic unit when they are received to control the operation of door 14. Other input signals such as signals from an up limit switch 110 and a down limit switch 111 are provided by the operation of the door opening and closing apparatus itself.

Up and down limit switches 110 and 111 are contained in head unit 11 and are controlled by an assembly 200 shown in FIG. 3. The limit switch assembly 200 of FIG. 3 includes a threaded drive shaft 201, which is attached to (not shown) and rotated by a motor 211 through a gear 203. Gear 203 is connected to the shaft 201 of driving motor 211 so that the rotation of the motor shaft 213 causes the rotation of threaded drive shaft 201. A switch actuating member 205 having an threaded aperture therethrough is threaded onto drive shaft 201 and kept from rotating by a securing member 207. When the motor 211 is energized to rotate in a direction to raise the door 14, shaft 201 rotates in a first direction and the actuation member 205 rises by the rotation of the shaft 201 acting through the threads. Similarly, as the motor shaft 213 and the shaft 201 rotate in the reverse direction, actuating member 205 travels downwardly. Actuating member 205 includes a protuberance 209 which engages and closes up limit switch 110 at the top of door travel and at the bottom of door travel, engages and closes down limit switch 111. When the door opening apparatus 10 of FIG. 1 is first fitted to the door 14, the positions of limit switches 110 and 111 are adjusted so that down limit switch 111 closes when the door 14 is in its maximum closed position and up limit switch 110 closes when the door 14 is in its maximum open or raised position. After initial adjustment, maximum open position is determined when the up limit switch 110 connects an electrical ground 112 to an up limit conductor 113 and the maximum down position is detected when switch 111 connects electrical ground 112 to a down limit conductor 115. Up limit conductor 113 and down limit conductor 115 are connected as inputs UL and DL, respectively, to logic unit 101.

The apparatus of FIG. 2 also includes an infrared obstruction detector 117. Obstruction detector 117 transmits an infrared light beam from one side of the door opening 14a to the other at a suitable height, such as one foot, in order to detect people or objects which might be contacted by a closing door. Normally, the infrared beam will pass freely from one side of the door opening 14a to the other and, the obstruction detector 117 will send a low logic level signal to the base of an NPN transistor 119. The low logic level signal will not turn transistor 119 on and an approximately 5 volt signal is applied to an input AOBS of logic unit 101, via conductor 120 and the operation of resistors 121 through 123, energized by a positive 28 volt potential. Alternatively, when the infrared beam strikes an object in the doorway and does not pass from side to side, a logic high signal is applied to the base of transistor 119, resulting in a signal near electrical ground being applied to the input AOBS of logic unit 101.

Logic unit 101 also receives at an input RPM a signal indicative of the rotation of the shaft 213 of motor 211. FIG. 4 shows motor 211 and an apparatus 214 for sensing the rotation of its shaft 213. A disk 215 attached to shaft 213 normal to the shaft's axis of rotation. Five light obstructing pins 217 are attached to the disk 215 in equally spaced relationship a common distance from the center of shaft 213. A light transmitting element, such as a light emitting diode 127, is fixedly attached to the same substrate as the motor 211 and in a position between the pins 217 and the center of shaft 213. A light receiver, such as a phototransistor 128, is attached outside the circle traced by pins 217 to receive light from the light emitting diode 127. As the motor shaft 213 rotates, light is transmitted from light emitting diode 127 to a base 128a of a phototransistor 128 when no pin is therebetween and no light is passed when a pin 217 is present between light emitting diode 127 and phototransistor 128. The electrical connections from light emitting diode 127 and phototransistor 128 are shown in FIG. 2. When motor shaft 213 is rotating, light will alternately be blocked and passed between light emitting diode 127 and the base of phototransistor 128, causing phototransistor 128 to alternately be turned on and off. By connection to a 5 volt supply through a resistor 129, a square wave is applied by phototransistor 128 to conductor 125, when motor shaft 213 is rotated. Conductor 125 is connected to the input RPM of logic unit 101. The duty cycle of the square wave applied to the input RPM is determined by the spacing between pins 217 relative to the diameter of pins 217, and is not critical in the present invention.

The signal from phototransistor 128 is also applied via conductor 125 to a pulse counter 251 and a monostable multi-vibrator 252. Pulse counter 251 is used to generate and transmit a signal MOV to logic unit 101 on conductor 256 when the motor shaft 213 is rotating at or above a predetermined rate. The pulse counter 251 includes a resettable binary pulse counter which counts each low to high transition on conductor 125 and records the count in binary format in an 8-bit shift register (not shown). When the shift register counts 25 or more transitions without being reset, a logic 1 signal is sent by the pulse counter 251 via the conductor 256 to the MOV pin of the logic unit 101. Logic unit 101 comprises an internal oscillator and circuitry for generating a number of timing signals. The period of the oscillator is determined by the value of a resistor 254 and a capacitor 255 connected between ground and terminals OSC 1 and OSC 2 of the logic unit 101. One timing signal is generated by the logic unit 101 every 0.5 seconds and is applied as a reset signal to pulse counter 251 via a conductor 257. The register of pulse counter 251 is cleared to zero in response to each reset signal. Thus, the value counted by counter 251 will exceed 25 only if 25 or more low to high transitions occur on conductor 125 during a 0.5 second interval. That is, when shaft 213 is not rotating or rotating at a rate which causes fewer than 25 transitions during each 0.5 second interval, no signal MOV will be received at the MOV terminal by logic unit 101, because pulse counter 251 will be reset prior to its counting to 25. Alternatively, a signal MOV will be received by logic unit 101 when shaft 213 is rotating at a rate which produces greater than 25 pulses each 0.5 second.

Monostable multi-vibrator 252 is used to determine the movement resistance forces applied to the door during its movement. When the movement resistance forces exceed a predetermined amount, a force obstruction signal OBS is applied by monostable 252 to logic unit 101 via a conductor 258. The basic principle of operation is that the rate of rotation of the door motor shaft 213 decreases as the resistance forces on the door increase. Monostable 252 is set by potentiometer 253 to generate a pulse OBS on conductor 258 at a predetermined interval unless the monostable is reset by a low to high transition of the signal on conductor 125 during an interval. When monostable 252 is reset, timing for a new pulse begins again. In the present embodiment, monostable 252 is adjusted by potentiometer 253 to produce a pulse on conductor 258 25 milliseconds after being reset by the signal on conductor 125. When the rotation of motor shaft 213 causes the phototransistor 128 to produce pulses on conductor 125 at intervals less than 25 milliseconds, monostable 252 will continue to be reset thereby without generating a signal OBS on conductor 258. Alternatively, should the motor shaft rotation rate slow sufficiently that the pulses are generated on conductor 125 at intervals greater than 25 milliseconds, monostable 252 will time out and generate a signal OBS on conductor 258.

Pulse counter 251, monostable 252 and their associated circuitry are shown separated from logic unit 101. The functions of these devices could be incorporated into the single integrated circuit of logic unit 101 such that the signals MOV and OBS would be generated entirely internal to the logic unit 101.

Logic unit 101 responds to the previously described input signals by sending a selected one of a plurality of motor control commands to motor control circuitry 147 including three relays 130, 131 and 132, thereby opening and closing door 14 on command. Door motor 211 includes an up winding 225 connected between an incoming motor conductor 220 and common 221 by a thermal reset switch 229 and a down winding 227 which is connected between an incoming motor conductor 222 and common 221 via the thermal reset switch 229. Door 14 is controlled to move up by selectively connecting 120 volts AC to up winding 225 via the conductor 220 and is controlled to move down by the connection of 120 volts AC to down winding 227 via conductor 222. The selective connection of the 120V operating voltage to the up and down windings 225 and 227 is performed by motor control circuitry relays 130, 131 and 132 which operate in response to control commands from logic unit 101.

Relay 130 includes a normally open single throw contact set 136 which is connected in series between the 120 volt operating voltage applied to a conductor 134 and both the up winding 225 and a normally open contact 138 of relay 131. The state of relay 130 is controlled by signals from logic unit 101 on a conductor 140. When the UPMTR2 signal on conductor 140 from logic unit 101 is a low level, a transistor 141 which has its emitter-collector path connected in series with the coil of relay 130 is in a high impedance state and relay 130 is not energized. Alternatively, when the signal UPMTR2 from logic unit 101 is a high level, transistor 141 is driven to a low impedance state energizing the relay 130 and closing contact set 136 so that the 120V AC potential is supplied to up winding 225.

The relay 131 includes a double throw relay contact set comprising an armature 137 which is connected to the 120 volt conductor 134, a normally open stationary contact 138 and a normally closed stationary contact 139. The particular one of stationary contacts 138 and 139 which is connected by armature 137 to the 120 volt supply, is determined by signal UPMTR1 from line unit 101 on conductor 142. In a manner similar to the operation of relay 130, relay 131 is energized and de-energized by the operation of transistor 143 in response to the signal UPMTR1. The normally closed contact 139 connects the 120 volt conductor 134 to armature of relay 132 while the normally open contact 138 of relay 131 is connected to up winding 225 via conductor 220.

Relay 132, which is controlled by a signal DWNMTR on a conductor 144 operating through a transistor 145, includes a normally open single throw contact set having a stationary contact 146 connected in series with down winding 227. Whenever relay 132 is non-energized, no voltage is applied to the down winding 227. Alternatively, when relay 132 is energized either the 120 volt conductor 134 or an open circuit is applied to down winding 227, depending on the state of relay 131.

The connection and operation of relays 130 through 132 provides certain redundancies in operation so that no single fault from the logic unit 101 through the relays 130 through 132 will prevent the door 14 from moving to the up position, which is considered safe. Logic unit 101 generates motor control commands consisting of the signals shown in Table 1 to control the movement of door 14 up and down and to stop the door. The door 14 is moved up by sending high level (logical 1) signals on both UPMTR1 and UPMTR2 and a low level (logical 0) signal on DWNMTR. Both relays 130 and 131 are energized by the up signals which redundantly apply 120 volts to up winding 225 via contact 136 of relay 130 and contact 138 of relay 131. Also, energizing relay 131 removes the connection of 120 volts to the down direction controlling relay 132.

The door 14 is moved down by energizing relay 132 while de-energizing relays 130 and 131. De-energizing relay 131 connects the 120 volts from conductor 134 to the armature of relay 132 which is connected to down winding 227 by closure of relay 132. In the stop condition, none of the relays 130 through 131 is energized and neither of the motor windings 225 or 227 receives the 120 volts from conductor 134.

TABLE 1

| MOTOR CONTROL COMMAND | UPMTR1 | UPMTR2 | DWNMTR |
|---|---|---|---|
| Up | 1 | 1 | 0 |
| Down | 0 | 0 | 1 |
| Stop | 0 | 0 | 0 |

Figure 5:
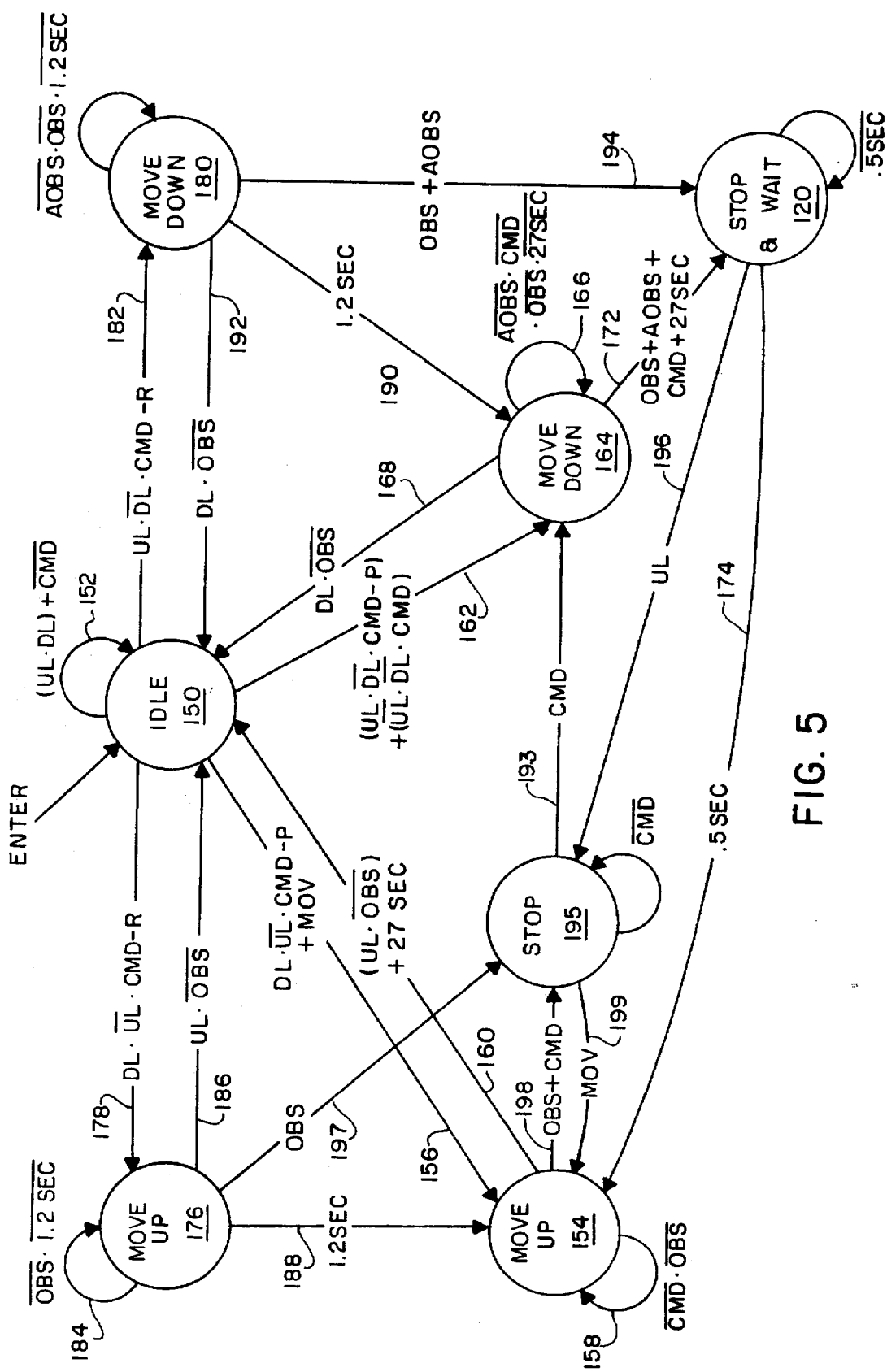
FIG. 5 is a state diagram of the operation of the garage door operator control circuit.

FIG. 5 is a state diagram showing the various states of the logic unit 101 and the inputs thereto which cause state changes. In the following description, it is assumed that the up and down limit switches 110 and 111 are properly set, that the movement force adjustment is set by potentiometer 253 and that the garage door operator 10 has just been powered up. Also, in the terminology of FIG. 5, any signal with a bar above it refers to the absence of that signal and the term CMD refers to either a command signal CMD-P from control unit 19 or a command signal CMD-R from the receiver/decoder 106.

Upon power up, an idle state 150 (FIG. 5) is entered. The idle state 150 is the normal waiting state when the door 14 is at its up or down limit. In the idle state, the stop signals of Table 1 are sent to control relays 130 through 132 via respective driver transistors 141, 143 and 145. When the circuitry and relays are operating without fault, the stop signals de-energize the windings 225 and 227 of motor 211 and motor shaft 213 is stationary. For reasons of safety, the rotation of motor shaft 213 is checked whenever the motor 211 is commanded to stop. When the rotation indicating signal MOV is detected by logic unit 101 one second after generating the stop command, control is transferred to the move up state 154 where the door 14 is raised to its safe upper limit position, if possible. When the motor 211 does stop rotating in response to the stop command, control remains in a loop 152 of the idle state 150 as long as no command is received (CMD) or as long as both the up and down limit signals (DL:UL) are received. Simultaneous up and down limit signals indicate a fault and no door movement is initiated during such conditions.

Assuming that the simultaneous UL and DL signals do not exist, control leaves the idle state 150 when either command signal CMD-R or CMD-P is received. When the command is a CMD-P signal, logic unit 101 checks whether the door 14 is at its up limit UL or its down limit DL as indicated by the states of up and down limit switches 110 and 111. If the door 14 is at the down limit DL, control proceeds from the idle state 150 to a move up state 154 via a path 156. In the move up state 154, the up signals of Table 1 are sent to control relays 130 through 132 and a loop 158 is entered. When the up limit UL is reached without encountering a force obstruction (OBS) control returns via a path 160 to the idle state 150. Control will also return to the idle state 150 when 27 seconds have passed in the move up state 154 without receiving an up limit signal UL. This last mentioned condition is a fault condition, since door travel time should never be as long as 27 seconds.

When control is in the idle state 150 and a command signal CMD-P is received while the door 14 is up (UL), control passes via a path 162 to the move down state 164. In move down state 164, the down signals of Table 1 are sent to relays 130 through 132 and a loop 166 is entered which will be exited if any of the signals AOBS, CMD or OBS are received or if 27 seconds pass in the move down state 164. When the signal DL is received without a force obstruction (OBS) having occurred, control moves from move down state 164 to the idle state 150 via a path 168. Should 27 seconds expire or one of the signals AOBS, OBS or CMD be received by the logic unit 101 while in the move down state 164, control proceeds to a stop and wait state 170 via a path 172. Control pauses in the stop and wait state 170 for one-half second then proceeds to the move up state 154, which is discussed above, via a path 174.

In the preceding description, control exits the idle state 150 in response to a command signal CMD-P from control unit 19. When a command signal CMD-R is received from receiver/decoder 106 while in the idle state 150, control moves to a move up state 176 via a path 178 when the down limit is present and moves to a move down state 180 via a path 182 when the up limit signal UL is present. In move up state 176, the up signals of Table 1 are sent to control relays 130 through 132 and a pause of 1.2 seconds occurs in a loop 184. During the 1.2 second pause, other command signals CMD-R are ignored so that multiple transmissions from remote transmitter 24 (FIG. 1) will not each be responded to as a separate signal. Should the up limit signal UL occur while in the move up state 176, control will return to the idle state 150 via a path 186. However, the more likely state change via a path 188 occurs when the 1.2 second period expires, giving control to move up state 154, which has been previously discussed.

The move down state 180 is entered from idle state 150 when the door 14 is at its up limit (UL) and a CMD-R command is received. In move down state 180, the down signals of Table 1 are generated and a 1.2 second pause, similar to the 1.2 second pause of move up state 176, is inserted before transferring control to the previously discussed move down state 164 via a path 190. Should the down limit signal DL be received while in the move down state 180, control returns to the idle state 150 via a path 192. Also, if either a force obstruction (OBS) or infrared obstruction (AOBS) occurs while in the move down state 180, control moves to the stop and wait state 170 via a path 194.

The state diagram of FIG. 5 also includes a stop state 195 which is entered via a path 196 if an up limit signal (UL) is received in the stop and wait state 170, via a path 197 if a force obstruction signal (OBS) occurs in the move up state 176 and via a path 198 if either a force obstruction (OBS) or a command CMD is received while in the move up state 154. In the stop state 195, the stop signals of Table 1 are sent to control relays 130 through 132. As previously described, whenever the control relays 130 through 132 are commanded to stop door movement, the motor shaft rotation is checked to make certain that the motor 211 has actually stopped. When a signal MOV indicating motor shaft rotation is sensed by logic unit 101 in the stop state 195, logic unit 101 detects a fault and control moves via a path 199 to the move up state 154 to raise the door 14 if possible. The up command sent to the control relays 130 through 132 in this situation, is considered a fault control signal intended to recover the garage door operator 10 from the detected motor rotation fault. When no motor rotation is detected in stop state 195, control will remain in stop state 195 until a command CMD signal is received which moves control to the previously discussed move down state 164 via path 193.

Any of the relays 130 through 132 can fail in the energized or in the non-energized position due to faults in the relay e.g., 130, its drive circuitry e.g., transistor 141 or the control signal source, e.g., logic unit 101. Should relay 130 fail in the non-energized position, the door 14 will respond normally to signals UPMTR2 and DWNMTR from logic unit 101 to raise and lower door 14. Alternatively, should relay 130 fail in the energized position, the door 14 will only travel up. Both of the failure states of relay 130 are safe since the door 14 either operates correctly or is being moved up. When the command down (Table 1) is generated with relay 130 failing in the energized position, both up and down windings 225 and 227 are energized, stopping motor rotation. Thermal switch 229 protects from any overheating in this dual winding energized mode by interrupting current to the windings 225 and 227.

Should relay 131 fail in the non-energized position, up and down movement of the door 14 is still correctly controlled by signals UPMTR1 and DWNMTR. Alternatively, should relay 131 fail in the energized position, the door 14 will travel up to the up limit and stop. No down movement of the door 14 is then possible, which is a safe failure mode.

Should relay 132 fail in the non-energized position, the door 14 is limited to upward movement. Alternatively, should relay 132 fail in the energized position, the door 14 will travel down during a stop command (Table 1). However, the continued movement during a stop command will be sensed by the signal MOV and the door 14 will be raised to its up limit.

While a preferred embodiment of the invention has been illustrated, it will be obvious to those skilled in the art that various modifications and changes may be made thereto without departing from the scope of the invention as defined in the appended claims.

What is claimed is:

1. Apparatus for opening and closing a garage door comprising:
   a motor having a rotatable member for rotating in a first direction to open the garage door and in a second direction to close the garage door;
   motor control circuitry responsive to motor control commands for selectively connecting electrical power to said motor to cause rotation of said rotatable member thereby opening and closing said garage door;
   control means for selectively sending one of a plurality of motor control commands to said motor control circuitry, said motor control commands specifying one of rotation of said rotatable member in said first direction, rotation of said rotatable member in said second direction, and no rotation of said rotatable member;
   means for sensing the rotation of said rotatable member after the sending of at least a predetermined one of said motor control commands; and
   means for sending fault control signals to said motor control circuitry when the rotation of said rotatable member sensed by said sensing means is not in accordance with the rotation specified by said at least one predetermined motor control command.

2. The apparatus of claim 1 wherein said at least one predetermined motor control command specifies no rotation of said rotatable member and said fault control signals comprise signals specifying the rotation of said motor in said first direction.

3. The apparatus of claim 1 wherein said motor comprises an up winding which, when connected to electrical power, rotates said rotatable member in said first direction and a down winding which, when connected to electrical power, rotates said rotatable member in said second direction; and
   said motor control circuitry comprises:
   first switching means responsive to said control commands during fault free operation for selectively connecting electrical power to said up winding or to an intermediate conductor;
   second switching means responsive to said control commands during fault free operation for selectively connecting said intermediate conductor from said first switching means to said down winding; and
   third switching means responsive to said control commands during fault free operation for selectively connecting electrical power to said up winding.

4. The apparatus of claim 3 wherein said control means comprises:
   means for generating upward movement control commands defining upward movement of said door;
   means for generating downward movement control commands defining downward movement of said door;
   means for generating stop commands specifying no movement by said door; and
   means responsive to said fault control signals for generating said upward movement signals.

5. Apparatus for raising and lowering a door comprising:
   a source of motor driving voltage;
   a motor having an up winding which, when energized by said motor driving voltage, raises said door and a down winding which, when energized by said motor driving voltage, lowers said door;
   control means for generating control signals defining door movement;
   first switching means responsive to said control signals during fault free operation for selectively connecting said motor driving voltage to said up winding or to an intermediate conductor;
   second switching means responsive to said control signals during fault free operation for selectively connecting said intermediate conductor from said first switching means to said down winding; and
   third switching means responsive to said control signals during fault free operation for selectively connecting said motor driving voltage to said up winding;
   wherein said control means comprises means for generating a downward movement control signal specifying the connection by said first switching means of said motor driving voltage to said second switching means by said intermediate conductor, the connection by said second switching means of the motor driving voltage from said intermediate conductor to said down winding and no connection by said third switching means between said motor driving voltage and said up winding.

6. The apparatus of claim 5 comprising fault detecting means for detecting faults in the operation of said apparatus.

7. The apparatus of claim 6 wherein said control means comprises:

means for generating upward movement control signals defining upward movement of said door;

means for generating downward movement control signals defining downward movement of said door;

means for generating stop signals specifying no movement by said door; and means responsive to the detection of a fault by said fault detection means for generating said upward movement signals.

8. The apparatus of claim 6 wherein said motor comprises a rotatable shaft and said fault detection means comprises means for sensing the rotation of said shaft.

9. The apparatus of claim 5 wherein said control means comprises means for generating a upward movement control signal specifying the connection by said first switching means of said motor driving voltage to said up winding and the connection by said third switching means of said motor driving voltage to said up winding.

10. The apparatus of claim 9 wherein said motor comprises a rotatable shaft and said apparatus comprises fault detection means for detecting improper rotation by said shaft in response to said control signals.

11. The apparatus of claim 10 wherein said control means comprises means responsive to a fault detected by said fault detection means for generating an upward movement control signal.

12. The apparatus of claim 5 comprising means responsive to the contemporaneous connection of said motor driving voltage to both said up winding and said down winding for interrupting current flow to both said up winding and said down winding from said motor driving voltage.

13. Apparatus for raising and lowering a door comprising:

a source of motor driving voltage;

a motor having an up winding which, when energized by said motor driving voltage, raises said door and a down winding which, when energized by said motor driving voltage, lowers said door;

control means for generating control signals defining door movement;

first switching means responsive to said control signals during fault free operation for selectively connecting said motor driving voltage to said up winding or to an intermediate conductor;

second switching means responsive to said control signals during fault free operation for selectively connecting said intermediate conductor from said first switching means to said down winding; and third switching means responsive to said control signals during fault free operation for selectively connecting said motor driving voltage to said up winding;

wherein said second and said third switching means each comprise a normally open single throw relay contact set and said first switching means comprises a double throw relay contact set having an armature contact connected to said source of motor driving voltage, a normally open contact connected to said up winding and a normally closed contact connected via said intermediate conductor to one contact of said second switching means.

* * * * *